United States Patent
Nérat

(10) Patent No.: US 7,932,812 B2
(45) Date of Patent: Apr. 26, 2011

(54) WIDE AREA AND LARGE CAPACITY INTELLIGENT OBJECT TRACKING SYSTEM AND METHOD

(75) Inventor: Emerson Nérat, Montréal (CA)

(73) Assignee: Purelink Technology Inc., Montreal (CA)

( * ) Notice: Subject to any disclaimer, the term of this patent is extended or adjusted under 35 U.S.C. 154(b) by 1546 days.

(21) Appl. No.: 10/525,082

(22) PCT Filed: Aug. 15, 2003

(86) PCT No.: PCT/CA03/01242
§ 371 (c)(1), (2), (4) Date: Sep. 1, 2005

(87) PCT Pub. No.: WO2004/017251
PCT Pub. Date: Feb. 26, 2004

(65) Prior Publication Data
US 2006/0111123 A1      May 25, 2006

(30) Foreign Application Priority Data
Aug. 19, 2002   (CA) ...................................... 2397501

(51) Int. Cl.
*H04Q 5/22*         (2006.01)
(52) U.S. Cl. .................. 340/10.1; 340/539.1; 340/572.3
(58) Field of Classification Search ................ 340/10.1, 340/10.4, 825.69, 825.72, 539.1, 572.3; 235/381, 235/385
See application file for complete search history.

(56) References Cited

U.S. PATENT DOCUMENTS

| | | | |
|---|---|---|---|
| 3,898,619 A * | 8/1975 | Carsten et al. ............ | 340/825.49 |
| 4,351,548 A * | 9/1982 | Cohn ............................. | 283/81 |
| 4,533,871 A | 8/1985 | Boetzkes | |
| 4,598,275 A | 7/1986 | Ross et al. | |
| 4,636,950 A * | 1/1987 | Caswell et al. ................. | 705/28 |
| 4,816,824 A * | 3/1989 | Katz et al. .................... | 340/5.86 |
| 5,210,785 A * | 5/1993 | Sato et al. .................. | 455/552.1 |

(Continued)

FOREIGN PATENT DOCUMENTS
EP          0 851 377 A1          7/1998
(Continued)

OTHER PUBLICATIONS
Digital Home Theater System User Manual; Samsung, www.samsung.com/US, Code No. AH68-02166R (0.0), IEEE 802.11 standard.

*Primary Examiner* — Vernal U Brown
(74) *Attorney, Agent, or Firm* — Venable LLP; Robert Kinberg; Kyle D. Petaja

(57) ABSTRACT

A wide area object tracking system comprises a primary and two secondary base stations. Each secondary base station is coupled to the primary base station to define a tag detecting cell. Each station receives a signal from a tag attached to a tracked object, yielding three signals indicative of the tag location within the cell. Many overlapping cells in a given space allow tracking objects within that space. The system comprises a central server coupled to the primary base station, and may include at least one tag recording unit and a tag recovery apparatus both coupled to the central server. The primary base station uses three channels to communicate with the tag, the central server, and with at least one other primary base station, the secondary base stations, and a portable control unit.

8 Claims, 13 Drawing Sheets

U.S. PATENT DOCUMENTS

| | | | |
|---|---|---|---|
| 5,313,052 A | 5/1994 | Watanabe et al. | |
| 5,478,991 A | 12/1995 | Watanabe et al. | |
| 5,528,232 A * | 6/1996 | Verma et al. | 340/825.49 |
| 5,576,692 A | 11/1996 | Tompkins et al. | |
| 5,594,425 A | 1/1997 | Ladner et al. | |
| 5,686,902 A | 11/1997 | Reis et al. | |
| 5,742,237 A * | 4/1998 | Bledsoe | 340/825.49 |
| 5,774,876 A | 6/1998 | Woolley et al. | |
| 5,798,693 A | 8/1998 | Engellenner | |
| 5,842,555 A | 12/1998 | Gannon et al. | |
| 5,856,788 A | 1/1999 | Walter et al. | |
| 5,862,142 A * | 1/1999 | Takiyasu et al. | 370/480 |
| 5,911,688 A | 6/1999 | Schaefer | |
| 5,920,261 A * | 7/1999 | Hughes et al. | 340/568.8 |
| 6,027,027 A | 2/2000 | Smithgall | |
| 6,057,756 A | 5/2000 | Engellenner | |
| 6,084,512 A | 7/2000 | Elberty et al. | |
| 6,097,301 A * | 8/2000 | Tuttle | 340/693.9 |
| 6,147,602 A | 11/2000 | Bender | |
| 6,269,342 B1 * | 7/2001 | Brick et al. | 705/20 |
| 6,307,473 B1 | 10/2001 | Zampini et al. | |
| 6,333,690 B1 | 12/2001 | Nelson et al. | |
| 6,380,894 B1 | 4/2002 | Boyd et al. | |
| 6,384,712 B1 * | 5/2002 | Goldman et al. | 340/10.3 |
| 6,388,569 B1 | 5/2002 | Engellenner | |
| 6,433,687 B1 | 8/2002 | Yamaashi et al. | |
| 6,452,496 B1 | 9/2002 | Van Horn et al. | |
| 6,459,376 B2 | 10/2002 | Trosper | |
| 6,466,130 B2 | 10/2002 | Van Horn et al. | |
| 6,515,588 B1 | 2/2003 | Sarabia | |
| 6,522,253 B1 | 2/2003 | Saltus | |
| 6,542,076 B1 * | 4/2003 | Joao | 340/539.14 |
| 6,545,605 B2 | 4/2003 | Van Horn et al. | |
| 2002/0057192 A1 | 5/2002 | Eagleson et al. | |

FOREIGN PATENT DOCUMENTS

| | | |
|---|---|---|
| EP | 0 940 763 A1 | 9/1999 |
| GB | 2 312 801 A | 11/1997 |
| GB | 2 365 683 A | 2/2002 |
| JP | 2002-114333 | 4/2002 |
| JP | 2002-183261 | 6/2002 |
| JP | 2002-207079 | 7/2002 |
| WO | WO-01/37004 A1 | 5/2001 |
| WO | WO 02/15115 A1 | 2/2002 |
| WO | WO 02/077925 A1 | 10/2002 |
| WO | WO-02/077942 A1 | 10/2002 |

* cited by examiner

WIDE AREA AND LARGE CAPACITY INTELLIGENT OBJECT TRACKING SYSTEM AND METHOD

FIELD OF THE INVENTION

The present invention relates to object tracking systems. More specifically, the present invention is concerned with wide area object and large capacity tracking system and method.

BACKGROUND OF THE INVENTION

Each year, hundred of thousands of baggages are lost in airports throughout the world. These losts cause tens of millions of dollars worth to the airlines in reimbursements, searching fees, storing, and rerouting.

There exists an international database for lost baggages: the SITA database, which is shared by about half the airlines. However, this database only contributes to retracing already lost baggages and does not prevent their losts.

The well-known Sep. 11, 2001 events have shown the tremendous need for increasing security in airport regarding people movement in specific zone.

The increasing competition among airlines, the difficulty for airlines to keep their market share, in addition to the fact that their clients are more demanding than ever result in the introduction of new systems for tracking baggages.

For example, Watanabe et al. in the U.S. Pat. No. 5,478, 991, issued on Dec. 26, 1995 and entitled "Aircraft Baggage Managing System Utilizing A Response Circuit Provided On A Baggage Tag" describe an example of such systems. Watanabe et al. teach a wireless baggage tracking system including electronic tags configured so as to transmit a radio signal, a reader disposed at a classification point of the baggage to transmit a question electromagnetic wave to the tag and to receive a response thereto, and a computer for inputting and storing baggage information read on the tags.

A first drawback of Watanabe's system is that it only allows detecting baggage at specific places along a baggage belt conveyor and not at any place in the airport. Moreover, a relatively long delay may occur between the time a baggage is actually lost and the moment the system detects the lost. Another drawback is that Watanabe's system does not allow any means to retrace a lost baggage. A further drawback is that it does not provide any means to manage the tags.

The U.S. Pat. No. 6,333,690, issued to Nelson et al. on Dec. 25, 2001 and entitled "Wide Area Multipurpose Tracking System" describes a system for electronically tracking and locating objects. The system includes a tag for sending a coded signal to a network of receiver base stations with limited but overlapping reception ranges. Each receiver base station places in its own memory the time at which a record enters its range, remains in range, and the time at which it leaves.

Nelson's system shares common drawbacks with Watanabe's such as the fact that it does not allow a precision beyond the range of the receiver, yielding a relatively long delay between the time a baggage is actually lost and the moment the system detects the lost. It does not allow any means to retrace a lost baggage, and it does not provide any means to manage the tags.

An improved wide area object and large capacity tracking system is therefore desired.

OBJECTS OF THE INVENTION

An object of the present invention is therefore to provide improved wide area object and large capacity tracking system and method.

SUMMARY OF THE INVENTION

More specifically, in accordance with a first aspect of the present invention, there is provided a wide area object tracking system comprising:

at least one primary base station and a pair of secondary base stations; each of the pair of secondary base stations being so coupled to the primary base station so as to define a tag detecting cell; each of the primary and two secondary base stations being configured to receive a tag signal broadcast from a tag attached to an object to be tracked, yielding three received signals indicative of the location of the tag within the cell;

whereby a plurality of overlapping the tag detecting cells in a given space would allow tracking objects at any place within the given space.

More specifically, a specific embodiment of a wide area object tracking system in accordance with the first aspect of the present invention further comprises:

at least one tag; each of the at least one tag being to be attached to an object to be tracked; the at least one tag including a memory to receive object-related information pertaining to the object to be tracked and being configured so as to generate and transmit a tag signal indicative of the object-related information;

a central server including a memory for storing the object-related information;

a tag recording unit coupled to the central server and being configured to program the memory of the at least one tag with the object-related information; and at least one portable control unit wirelessly coupled to at least one of the central server and the at least one primary base station; the at least one portable control unit being configured to receive at least one of the tag signal, the object-related information and the location of the tag within the detecting cell.

A wide area object and large capacity tracking system according to the present invention allows, for example, managing efficiently an object inventory. It can also be used to track baggages in and throughout airports.

Indeed, a wide area baggage tracking system according to the present invention allows airlines to manage baggages and other objects or persons, allowing to minimize their losts and offering an efficient way to retrace lost baggages and improve baggage management efficiency.

A wide area and large capacity intelligent baggage tracking system according to the present invention allows:

tracking baggages at any points between the baggage registering desk at the departure airport to the baggage recuperating carrousel at the arrival airport;

providing to passengers means to consult information on the location of its baggage; and establishing the precise trajectory of baggages, of other objects, and people in the airport, and allowing the airport's security and managing people tracking information; and managing tags during and between activations.

In accordance to a second aspect of the present invention, there is provided a wide area object tracking method comprising:

activating at least one tag to be attached to an object to be tracked causing the at least one tag to broadcasting a tag signal indicative of information pertaining to the object to be tracked;

providing at least one primary base station and a pair of secondary base stations; the pair of secondary base stations being so coupled so as to define a tag detecting cell with the primary base stations;

each of the at least one primary base station and the pair of secondary base stations coupled thereof listening for tag signals within the tag detecting cell; and upon detection of one of the tag signals by the at least one primary base stations and the pair of secondary base stations coupled thereof, yielding three respective received signals, using the three respective received signals to determine the location of the at least one tag within the tag detecting cell.

Finally in accordance to a third aspect of the present invention, there is provided a wide area intelligent object tracking system comprising:

a plurality of tags, each to be attached to a different object to be tracked; each of the plurality of tags including a memory to receive object-related information pertaining to the different object to be tracked and being configured so as to generate and transmit a tag signal indicative of the object-related information;

a plurality of primary base stations, each coupled to a pair of secondary base stations so as to define a tag detecting cell; the plurality of primary base stations defining overlapping cells; each of the primary and two secondary base stations being configured to receive the tag signals, yielding three received signals to be processed by the primary base station yielding the location of the tag within the cell; and a central server coupled to the plurality of primary base stations for receiving at least one of the tag signals and the location of the tag within the cell and including an expert agent for tracking the plurality of tags within the overlapping cells.

Other objects, advantages and features of the present invention will become more apparent upon reading the following non restrictive description of illustrative embodiments thereof, given by way of example only with reference to the accompanying drawings.

DETAILED DESCRIPTION OF THE INVENTION

Figure 1:
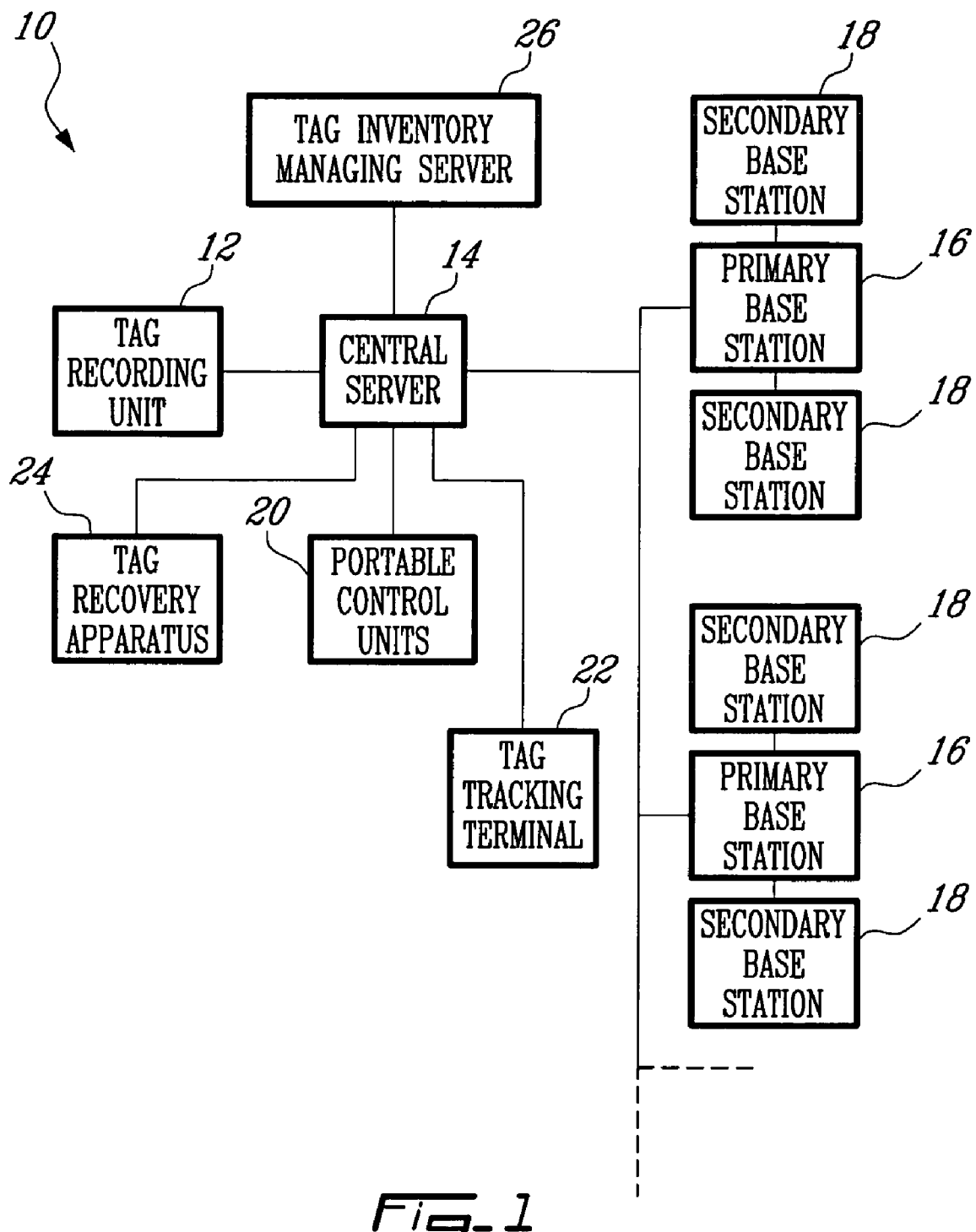
FIG. 1 is a bloc diagram of a wide area object and large capacity tracking system according to an illustrative embodiment of a first aspect of the present invention.

Turning now to FIG. 1 of the appended drawings, a wide area object and large capacity tracking system 10 according to an illustrative embodiment of the present invention is illustrated.

Figure 2:
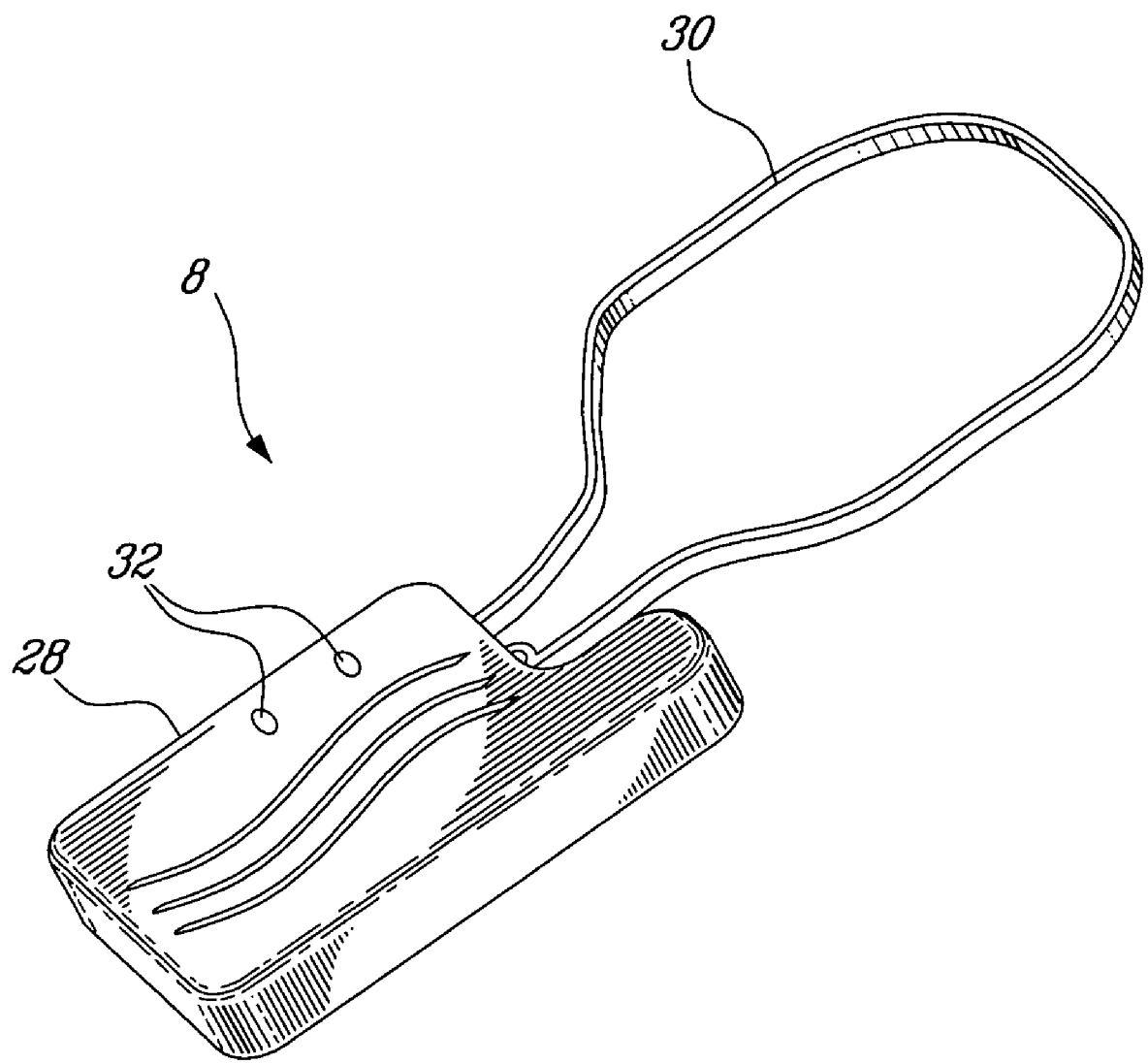
FIG. 2 is a perspective view of a tag according to an illustrative embodiment of a second aspect of the present invention.

According to the illustrative embodiment, the system 10 is in the form of a wireless system allowing to track baggage 6, bags (not shown), persons (not shown), etc. in real-time in airports and from airports to airports via the use of wireless tags 8 (see FIG. 2).

The wide area and large capacity intelligent baggage tracking system 10 comprises a tag recording unit 12, a central server 14, a plurality of primary base stations 16 coupled to the server 14, two secondary base stations 18 for each of primary base station 16 and being coupled to the primary base station 16, portable control units 20 configured so as to be selectively coupled to the central server 14, tag tracking terminals 22, tag recovery apparatus 24 and a tag inventory managing server 26.

Figure 3:
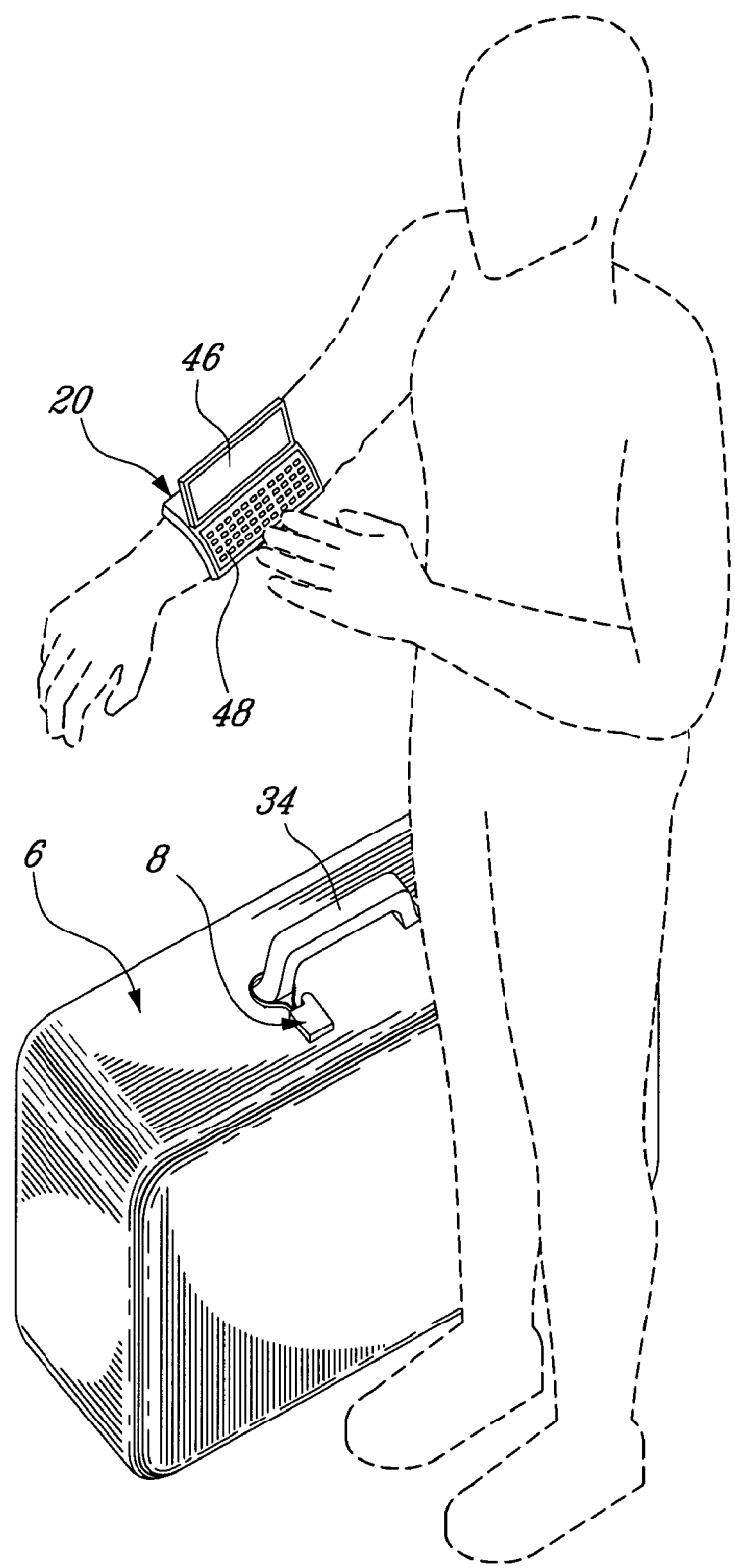
FIG. 3 is a perspective view illustrating the tag from FIG. 2, attached to a baggage and the portable control unit from FIG. 1.

As illustrated in FIG. 2, each tag 8 includes a casing 28 and a loop 30 secured to the casing 28 at one end and releasably mounted in the casing 28 at its other end via a releasable locking mechanism (not shown). Alternatively, the loop 22 may be replaced by another attaching means. Of course, both ends of the loop 30 may alternatively be releasably mounted to the casing 28. FIG. 3 illustrates a tag 8 attached to the handle 34 of a baggage 6.

Each tag 8 includes a power source in the form of a battery (not shown), a controller (not shown), a memory (not shown), a receiver (not shown), and a transmitter (not shown) embodied, for example, in electronic circuitry comprised within the casing 28.

The controller, receiver and transmitter allow a tag 8 to communicate with primary and secondary stations 16-18, the recording unit 12 and other wireless components of the system 10.

More specifically, each tag 8 is configured so as to:
a) transmit a request signal after its free end is locked in the body 28 by the locking mechanism;
b) receive from the tag recording unit 12 an identification code and a list of checkpoints;
c) be locked or unlocked;
d) emit a visual signal via, for example, LEDs (Light Emitting Diode) 32 mounted to its casing 28;
e) communicate with the tag recording unit 12, the portable control units 20, and the tag recovery apparatus 24;
f) transmit an identification code at predetermined intervals;
g) verify the concordance of the checkpoints and send an alarm signal if there is any discrepancy;
h) emit a visual signal, such as the LEDs 32 flashing, upon receiving a triggering signal from a nearby portable control unit 20;

i) emit its identification code and information stored in its memory, for example, upon request of a nearby portable control unit 20;

j) emit a visual signal, such as the LEDs 32 flashing, upon receiving a triggering signal from a primary station 16;

k) accept and receive verification and diagnostic command signals from the tag recovery apparatus 24; and l) unlocked the locking mechanism whenever an appropriate signal is transmitted by the tag recovery apparatus 24.

Of course, the tags can be configured with other visual signal emitters than LEDs 32. Also, it can be modified to emit sound signals instead of visual signals.

The operation of each tag 8 is as follows. Upon activation of the tag 8 by the tag recording unit 12, the tag 8 broadcasts its identification code at a predetermined time interval. The tag 8 then puts itself in a listening mode for a brief time after broadcasting its identification code, before putting itself in a sleep mode. The listening mode allows the system 10 to communicate with the tag 8 to obtain information therefrom or to modify some of its operating parameters.

The checkpoints stored in the tag memory include a sequential list of the primary base stations 16 that the tag 8 is expected to meet along its path. The checkpoints list allows each tag 8 to assess its own progression in the airport towards its final destination. Each tag 8 is configured so that any discrepancy between its expected path and the tag 8 actual path triggers an alarm signal recognizable by the system 10.

The electronic circuitry of the tag 8 and the locking mechanism are so coupled that any breakage or attempt to break the loop 30 after wilful locking of the locking mechanism triggers an alarm signal, that is to be received by the system 10, indicative of the breakage Other features and functions of the tags 8 will become more apparent upon reading the description of the system 10 and of its different components.

Figure 4:
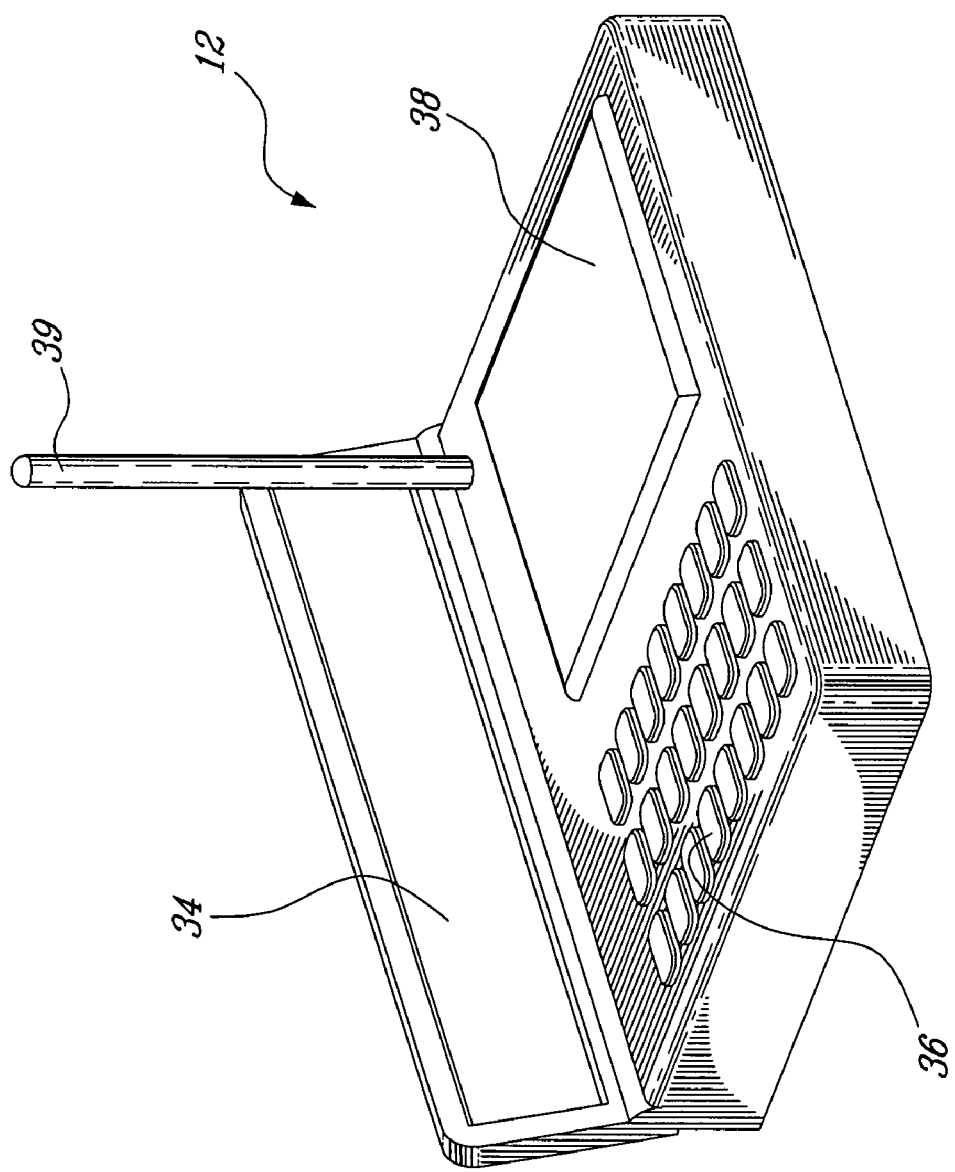
FIG. 4 is a perspective view of the tag recording unit from FIG. 1.

The tag recording unit (TRU) 12 will now be described in more details with reference to FIGS. 1 and 4. The TRU 12 is in the form of a computer terminal wirelessly coupled to the central server 14. Of course, the computer terminal 12 can also be connected to the central server 14 via cables.

The computer terminal 12 includes a visual display 34, an input means in the form of a keyboard 36 allowing a person to associate information to a selected tag 8, a tag input port 38 for wireless communication with a tag 8, and a wireless receiver/transceiver unit (not shown) including an antenna 39 for wireless communication with the central server 14. The visual display can take many forms including a plasma screen and a pixel screen.

The TRU 12 is positioned on or near the baggage registering desk 40 (see FIG. 9) and allows to activate tags 8.

The TRU 12 is configured so as to:

a) display on its visual display 34 a user-interface;

b) detect the signal from a tag positioned onto the tag port 38;

c) associate the detected identification signal and the corresponding baggage 6 to a specific traveller;

d) upon receiving a command from the operator via the input means 36, transmit via the tag port 38a communication code triggering the tag 8 to begin transmitting its identification code at a predetermined interval;

e) to verify, upon activation of a tag 8, the integrity of the signal transmission from the tag 8; and f) when the activation of a tag is successful, to transmit to the central server 14 information stored in the tag memory or related to the tag 8.

The TRU 12 generates identification code according to a predetermined algorithm. For reliability purposes, the TRU 12 compares periodically the list of generated codes stored in its memory to the ones received and stored by the central server 14.

Of course, more than one TRU 12 is usually provided with each system 10, one for each baggage registering desk 40 for example.

Figure 5:
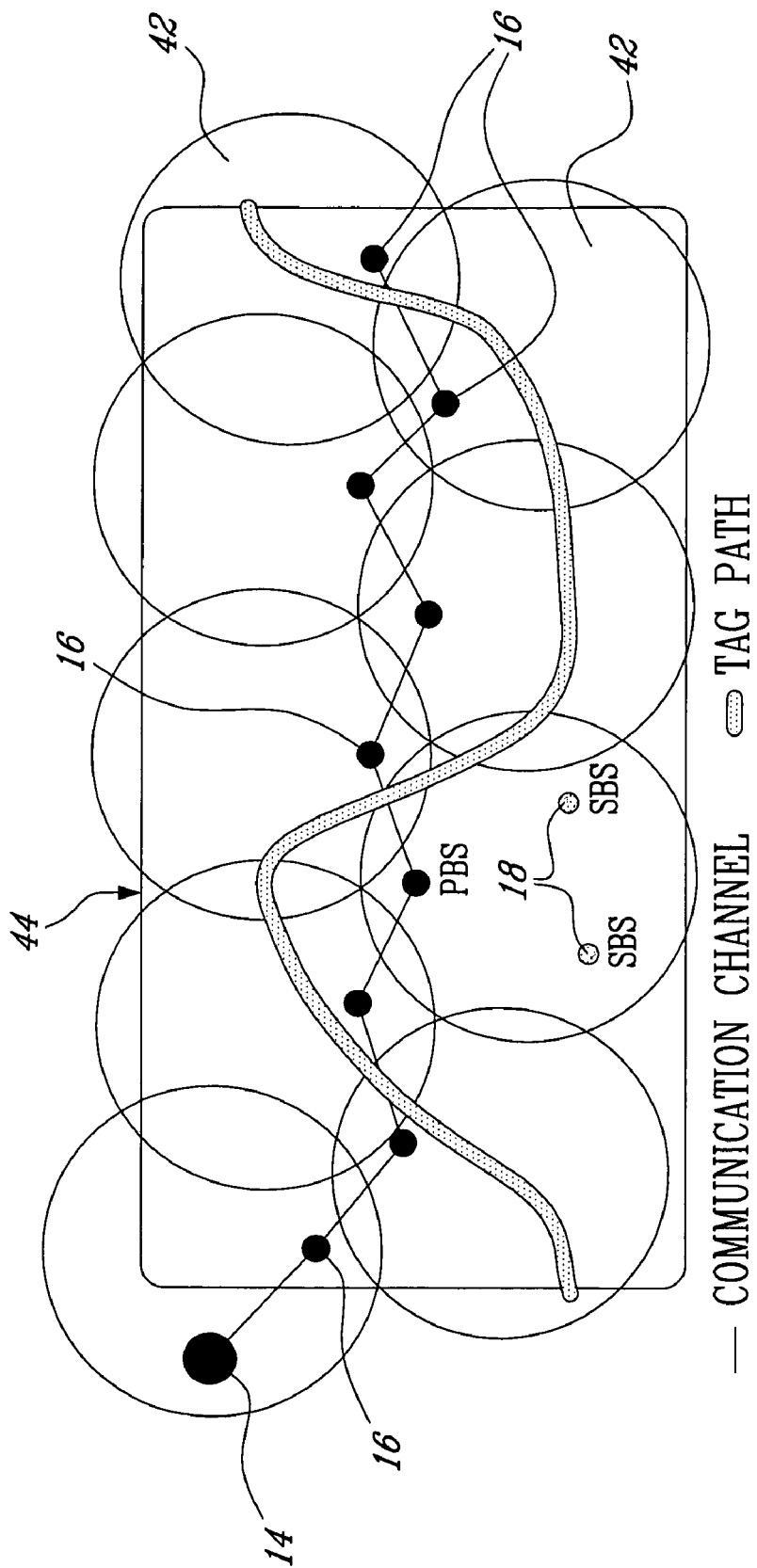
FIG. 5 is a schematic view illustrating an example of configuration of the primary and secondary base stations from FIG. 1.

Turning now to FIGS. 1 and 5, the primary and secondary base stations 16-18 will now be described in more details.

Each primary base station (PBS) 16 defines a cell 42 covering part of the baggage handling area 44. For example, each cell defines a circular area having a 100 m radius, yielding a 31 400 m$^2$ area cell. The PBS 16 are so positioned that the cells 42 are overlapping therefore allowing to cover the entire baggage handling area 44.

Each PBS 16 includes a controller (not shown), a memory (not shown), a receiver (not shown), a transceiver (not shown) and control circuit (not shown).

The PBS 16 are configured to wirelessly communicate through three channels: a first one for communication with the tags 8, the second one for communicating tag identification codes and other tag parameters to the central server 14, and a third one for communication between the primary base stations 16, secondary base stations 18 and the portable control units 20. The communication protocol used is IEEE 802.11. Of course, other communication protocol may also be used. The system 10 may allow simultaneous communication between about 128 PBS 16 and portable control units 20 in direct spread spectrum (DSS). Of course, other communication protocols can be used. Alternatively, since the primary and secondary base stations 16-18 are immobilized, they can be interconnected via cables (not shown).

Each primary base station 16 is configured to:

1. communicate with the central server 14 so as to obtain the list of active tags 8;
2. detect the coded signal of each tag 8 entering its cell 42;
3. receive and store information incoming from the SBS 18;
4. determine the position of tags 8 within a cell 42;
5. transmit to the central server 14 tags' coordinates or other tag-related information such as checkpoint-related codes;
6. signal the lost of a tag 8 and estimate the probable position of the tag 8 using the last known position;
7. transmit frequent query signals to communicate with a lost tag 8;
8. manage the communication with tags 8 and with two SBS 18 present within the cell 42;
9. manage and relay to the central server 14 communications incoming from the portable control units 20; and
10. allow communication between PBS 16.

Each secondary base station 18 is configured to:

1. dynamically receive a list of tags 8 from the cell's PBS 16;
2. record and relay to the PBS within the same cell 42, the time of arrival and identity of each tag 8 within the cell 42; and
3. relay commands from then cell's PBS 16 whenever the wireless communication is unclear.

More specifically, the PBS 16 queries all tags 8 within its cell 42 within a very short frame of time, including receiving a request from the central server 14, query the tags 8 within the cell 42, and begin searching procedure for missing tags. For example, the system 10 allows to read more than 10 000 tags 8 in a cell in less than one second.

The PBS 16 together with the two SBS 18 within a cell 42 achieve the localisation of tags using Time Difference of Arrival (TDOA) 84, Received Signal Strength (RSS), and Artificial Neural Network (ANN) 86 techniques using signals received from the tags 8.

In addition to the three above-mentioned techniques a Modified Time of Arrival (M-TOA) technique is also used.

The provision of ANN allows freeing the system 10 from huge databases traditionally used to map the electromagnetic field distribution of an area including moving objects such as tags 8. Knowing this distribution and other related data allows averaging the environment of a mobile object and deducing certain information about the tag's position.

Figure 13:
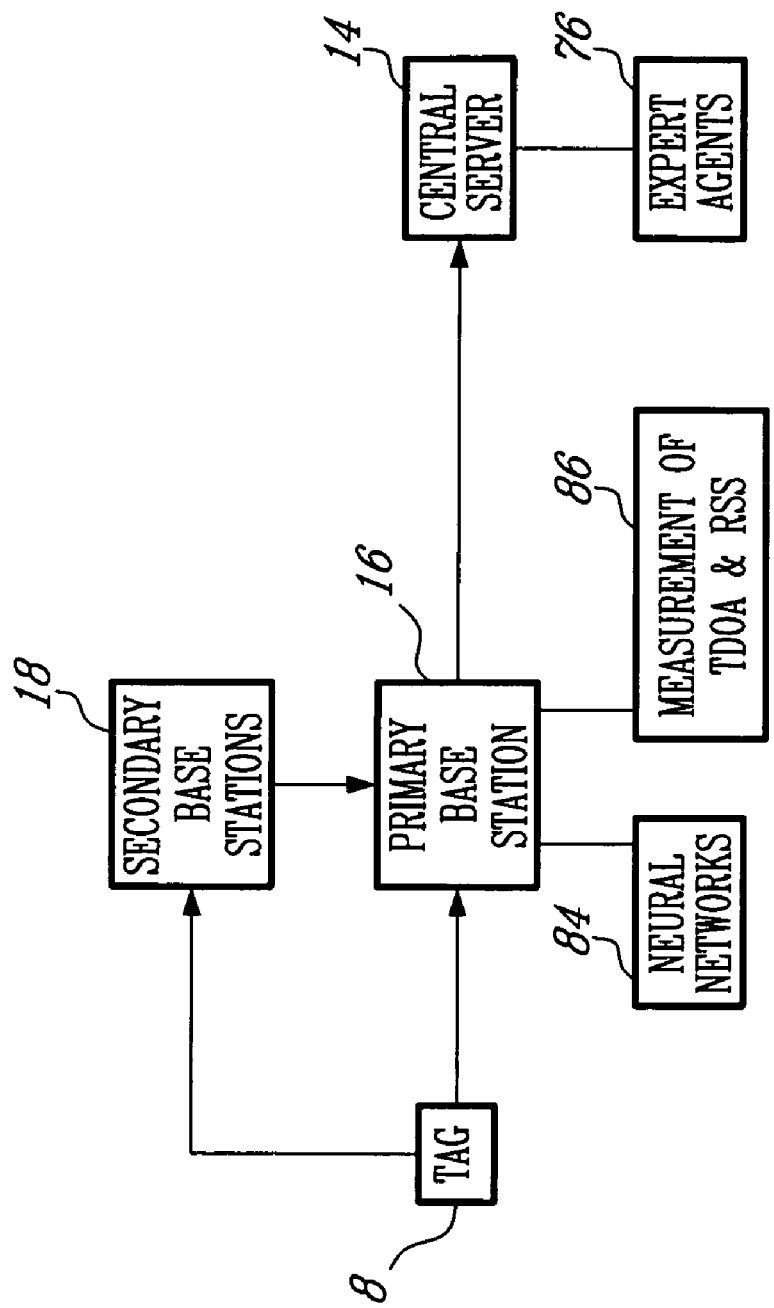
FIG. 13 is a schematic view illustrating a tag localization method according to a third aspect of the present invention.

As illustrated in FIG. 13, the ANN 84 and the TDOA 86 technique is used to accurately locate tags 8 and yields relatively simple network architecture. Before processing the tag signals in the ANN 84, two pre-process are performed: a hyperbola computation, a fast tag localisation using the TDOA 86 and correlation between the signal amplitudes detected by the PBS 16 and SBS 18.

As it is well known in the art, a learning process is first executed by the ANN 84 to established prediction parameters and to adjust their internal free parameters This adjustment allows minimizing the prediction errors by minimizing the performance function of the neural net (quadratic error average). Every entry in the ANN 84 is indicative of the multiple tag path time delays as received by the PBS 16 and SBS 18.

Once the localisation of tags 8 is achieved, the resulting coordinates of each tag 8 are sent to the agent expert 76 (see FIG. 12) of the central server 14 for tag grouping or bundle processing. This localisation procedure can be executed many times each second on a specific tag 8 or group of tags to obtain an improved precision on its/their localisation.

Since TDOA, RSS and ANN techniques are believed to be well known in the art, it will not be described herein in more details. Alternatively, other techniques can be used to locate tags.

Since the PBS 16 can be located outside the reach of the central server 14, they are equipped with an inter-PBS communication module allowing PBS 16 located outside the reach of the central server 14 to communicate therewith via the nearer PBS 16 which relay the information from the out-of-reach PBS 16 to the central server 14. Similarly, the PBS 16 allows the portable control units 20 to communicate with the central server 14. The system topology is of the Extended Service Set (ESS)-type including multiple access points (AP). Of course, other system topology can alternatively be implemented.

The portable control unit (PCU) 20 is in the form of a small module that a person can wear around the forearm (see FIG. 3) or alternatively at the waistband or on the shoulder for example.

The PCU 20 includes an output means in the form of a text or graphical display screen 46, an input means in the form, for example, of a keyboard 48, a receiver (not shown), and a transceiver (not shown). The PCU 20 is configured so as to be wirelessly coupled to the system 10, and more specifically to the central server 14, and PBS 16.

The PCU 20 is also configured so as to allow:

1. communication with the central server 14, for example to retrieve a list of tags 8 boarding on or unloading from a plane;
2. upon receiving input command from a user via the keyboard 48, sending a signal to tags 8 boarding on or unloading from a selected plane requesting the tags 8 to identify themselves to the PCU 20 and to send both their source and destination;
3. comparing the information received from the queried tags 8 with pre-stored information;
4. displaying to the operator the result of the previous comparing steps, providing a list of missing tags 8;
5. in cases of missing tags 8, forwarding to the central server 14 the list of missing tags 8, so that the central server 14 initiates a retrieving procedure; and
6. if all tags acknowledge their presence on the right plane, sending, upon receiving command from the operator via the input means 48, a confirmation signal triggering a sleep mode in the onboard tags 8.

The sleep mode is active until an activation code is sent to each tag 8 inactivated by the sleeping mode.

The PCU 20 is programmed with a tag-searching mode. This mode can be activated, for example, when a tag 8 does not respond between to checkpoints or if a tag 8 sends a distress signal. The central server 14 then initiates a tag search. If the missing tag 8 is retraced by the system 10, an operator having a PCU 20 is sent to retrieve the corresponding missing baggage 6 (see FIG. 3). The coordinates of missing tags 8 are downloaded to the PCU 20 at a predetermined frequency. A graphical user interface is displayed on the screen 46 to allow the operator to evaluate the location of broadcast of the tag 8. The PCU 20 can be used, after retrieving a tag 8, to acknowledge the retrieval to the central server 14.

Figure 6:
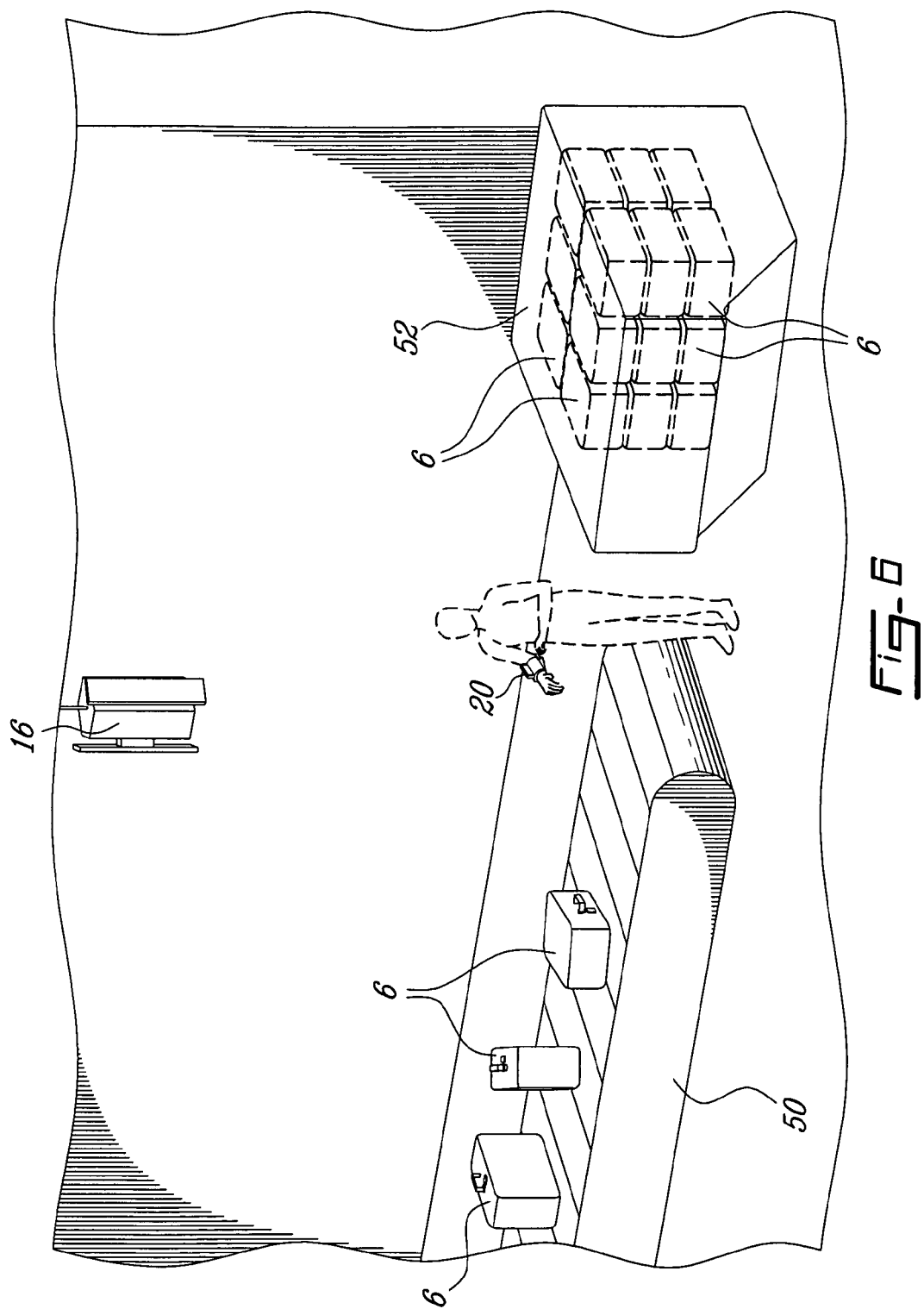
FIG. 6 is a perspective view illustrating the operation of the portable control unit from FIGS. 1 and 3.

The PCU 20 can also be used to manage baggage 6 incoming from a conveyor 50 (see FIG. 6) or from a trolley to be loaded into a container 52. The PCU 20 allows knowing the number and location of each baggage 6 loaded in the container 52. Indeed, knowing the capacity of the container 52, which is inputted in the PCU 20, and the sequence of loading of the container 52, the position of each tag 8 in the container 52 can be determined.

Figure 7:
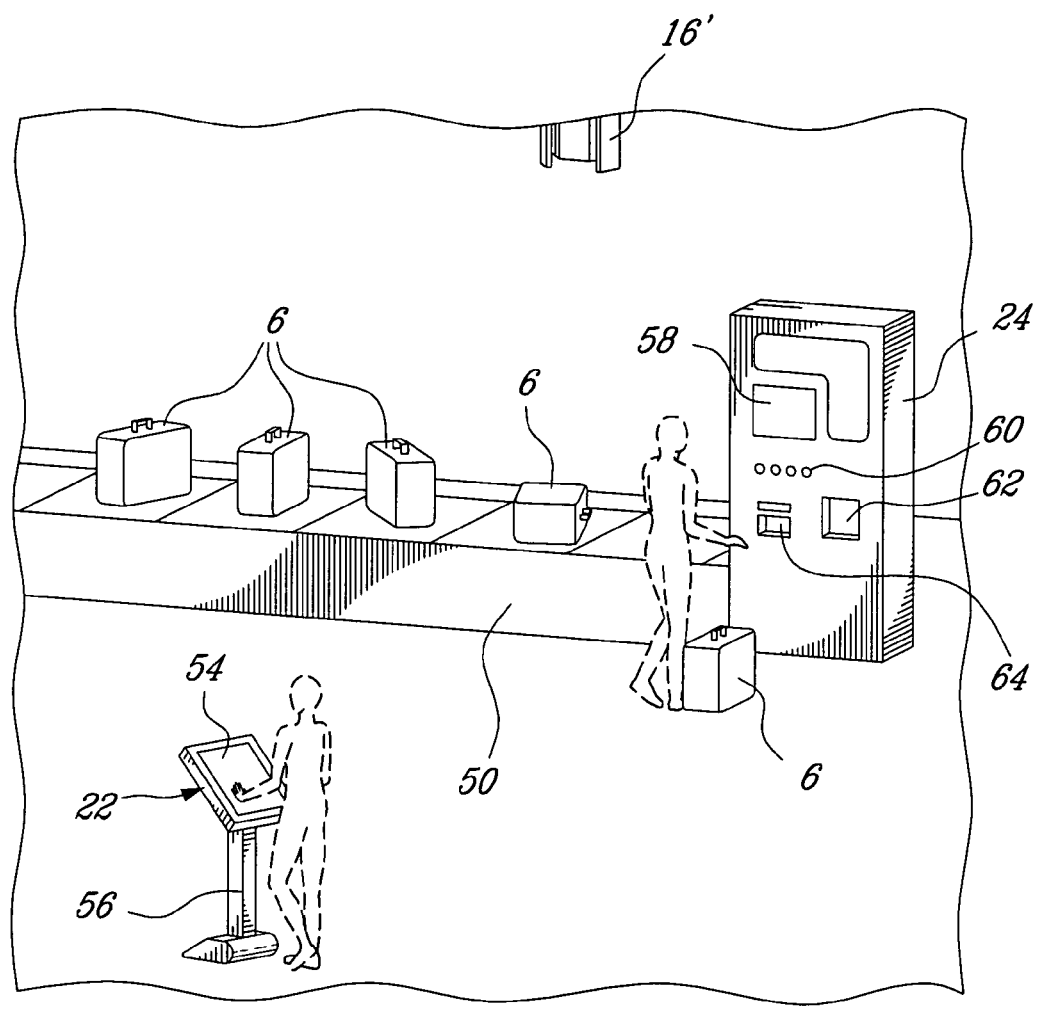
FIG. 7 is a perspective view illustrating the tag tracking terminal and tag recovery apparatus from FIG. 1.
Figure 8:
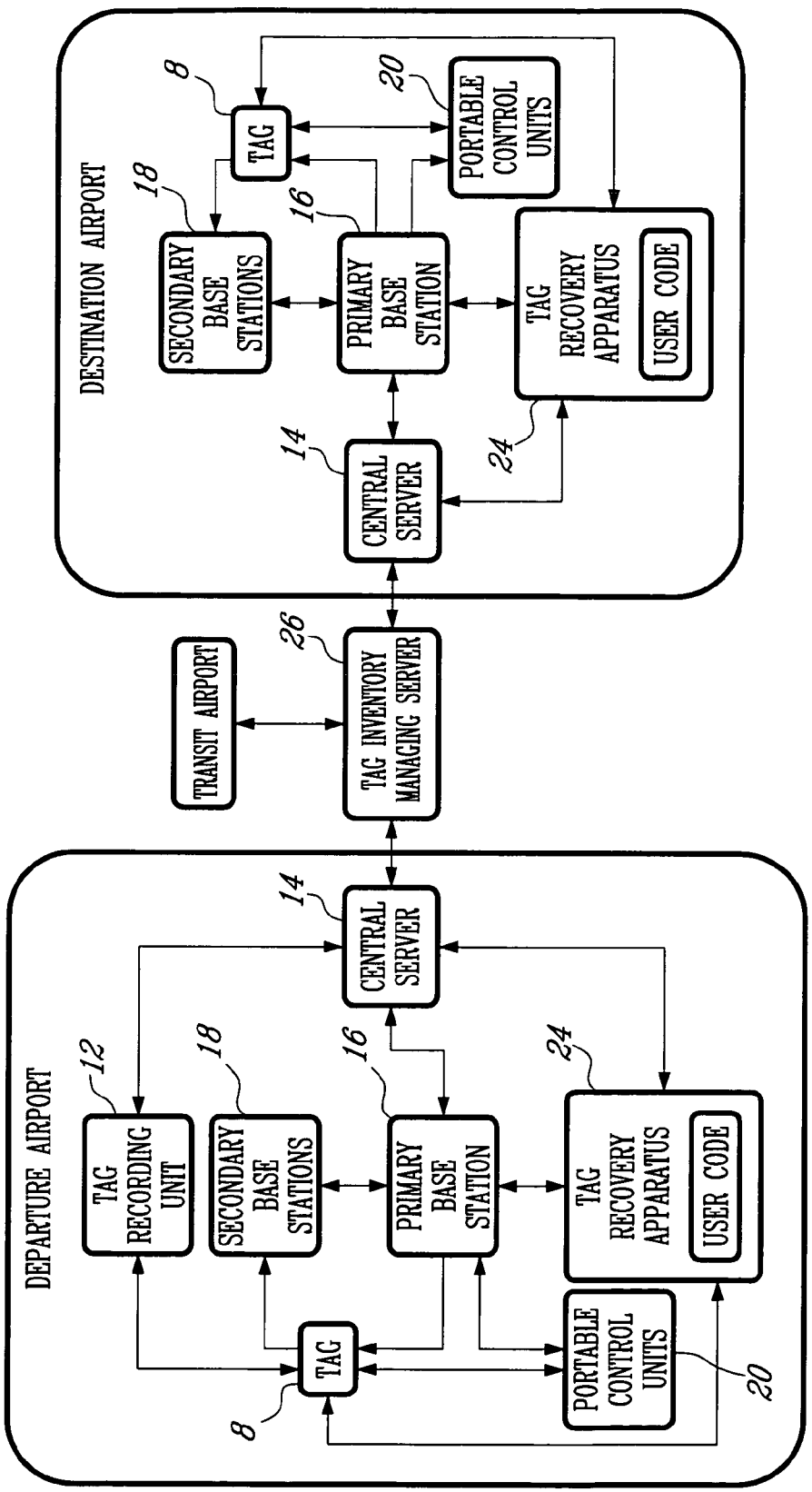
FIG. 8 is a functional bloc diagram of the wide area object and large capacity tracking system from FIG. 1.

Turning now to FIG. 7, the tag tracking terminal 22 and tag recovery apparatus 24 will be described in more detail. Each of the tag tracking terminal 22 and tag recovery apparatus 24 are either wirelessly coupled to the central server 14 or connected thereto via cables.

The tag tracking terminal 22 is in the form of a touch screen 54 mounted on a stand 56. The touch screen 54 allows a person to consult with the central server 14 so as to inquire the location of a specific tag 8. Of course, more than one tag tracking terminal 22 can be provided with the system 10. The tag tracking terminal can take other forms. For example, a dedicated telephone line, provided with a voice-recognition algorithm and voice synthesiser, can allow a user to query the central server 14 about the location of a specific tag.

The tag recovery apparatus (TRA) 24 includes an output means in the form of a display screen 58, an input means in the form of a series of buttons 60, a tag depository compartment 62, and a guarantee ticket distributor 64.

The output and input means 58-60 can take other form. For example, the input means can be in the form of a keypad (not shown), or the display screen 58 can be in the form of a touch screen (not shown).

The TRA 24 includes a controller (not shown) configured so as to display on the screen 58 a user menu offering to the user different form of retribution in exchange for a tag 8.

The TRA 24 retrieves a list of tag's identification codes from the central server 14. This list can be obtained from the origin or transit airport.

The input means 60 allows the user to input an unlocking code given to him during the baggage-registering step. Once the code is entered and validated by the TRA 24, the TRA 24 transmits to the corresponding tag 8 an unlocking code that causes the unlocking of the tag 8.

A baggage tracking system according to the present invention provides for many ways of managing the tags 8.

For example, a tag 8 can be obtained in exchange of a certain amount of money at the baggage-registering step. The same amount can then be recuperated from the TRA 24 in exchange of the tag 8. The TRA 24 can be configured to offer and provide the amount to the user in many forms including cash, discount coupon for a flight, etc. Alternatively, a user may be able to purchase his own tags 8 that are activated upon registering its baggage and unlock or simply deactivated by inputting the unlocking code into the TRA 24. The TRA 24 allows an efficient management of tags 8 and provides a means for the airlines or the airport for not bearing the expenses related to the tags 8.

The TRA 24 is configured to allow recharging the recuperated tags 8 and diagnostic defects and sort tags 8 accordingly.

The TRA 24 forwards information about the recuperated tags 8 to the central server 14.

The tag inventory-managing server (TIMS) 26 is remotely connected to the central server via the Internet. Alternatively, it can be connected via another dedicated computer network or be directly coupled to the central server 14. In cases where systems such as system 10 are implemented on different airports, the TIMS 26 allows receiving, storing and forwarding to remote system 10, information about each tags 8 tracked by each system 10. This allows the system 10 implemented in a destination airport to continue tracking tags 8 that have been activated in another airports.

Additionally, the TIMS 26 may store in a memory the location of all tags 8 that are tracked by each local system 10. Knowing information related to each tag 8, such as its position, the airports from which it has been issued or the airline that activated it, the TIMS 26 can manage for example, their rerouting towards the issuer of the tag 8.

Other features and characteristics of the system 10 will become more apparent upon reading the following description of the operation of the system 10 given with reference to FIGS. 3 and 6 to 10.

Figure 9:
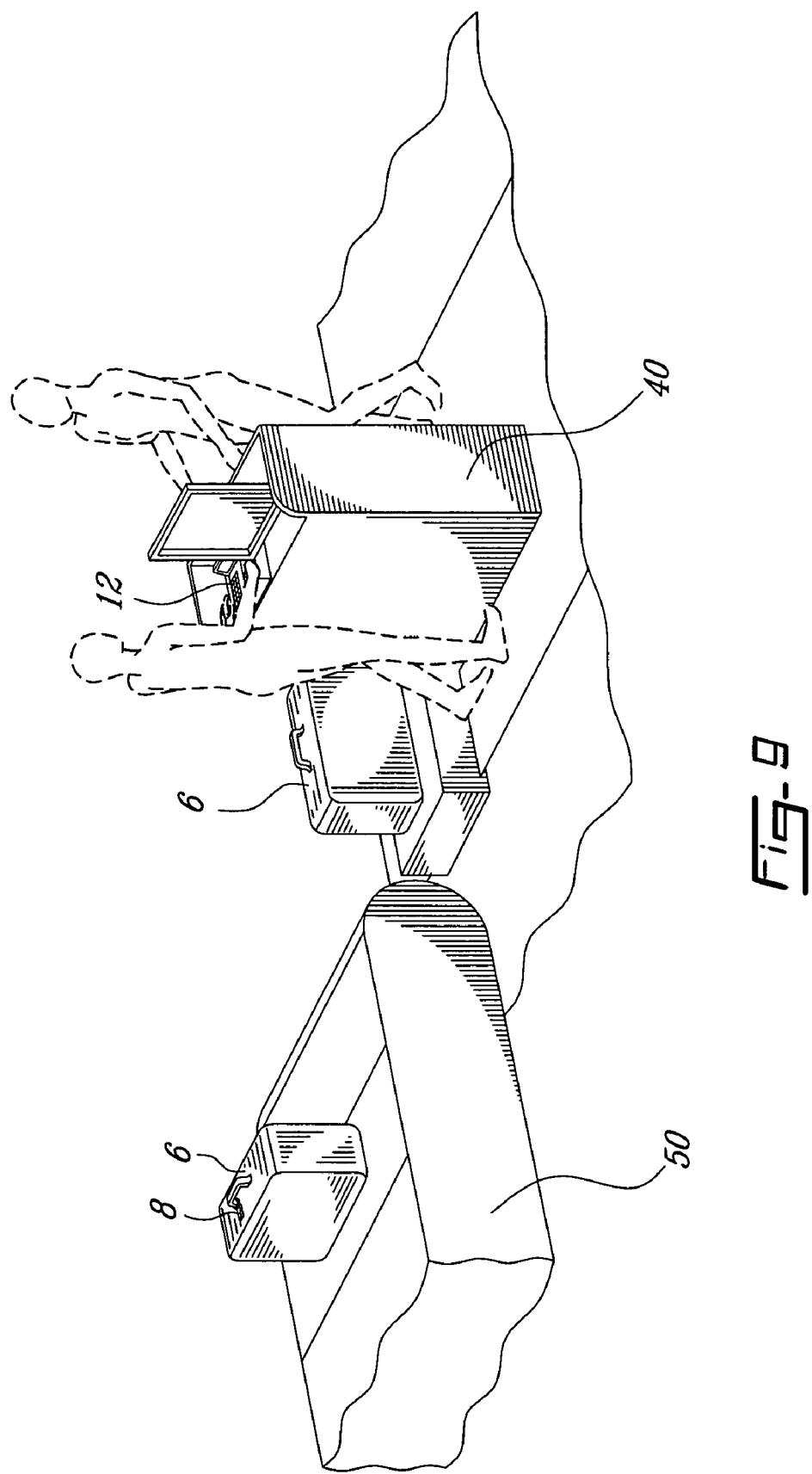
FIG. 9 is a perspective view illustrating the registering of baggage and tag validation using the portable control unit from FIGS. 1 and 3.

As illustrated in FIG. 9 and discussed hereinabove, a tag 8 is activated using the TRU 12 and tied to the handle of each baggage 6 that is registered at one of the baggage registering desk 40. The baggage 6 is then deposited onto a conveyor to be sent to a predetermined loading dock (not shown).

During the activation of a tag 8, information pertaining to the owner of the baggage 6 to which the tag is associated is stored in the tag memory. This information includes, for example, codes identifying the boarding, transit and destination airports, the airline, and the owner of the baggage.

At the end of the activation process, the TRU 12 sends the tag information to the central server 14.

In addition to activating the tag 8, the TRU 12 verifies the integrity of each tag 8 before its activation.

Figure 10:
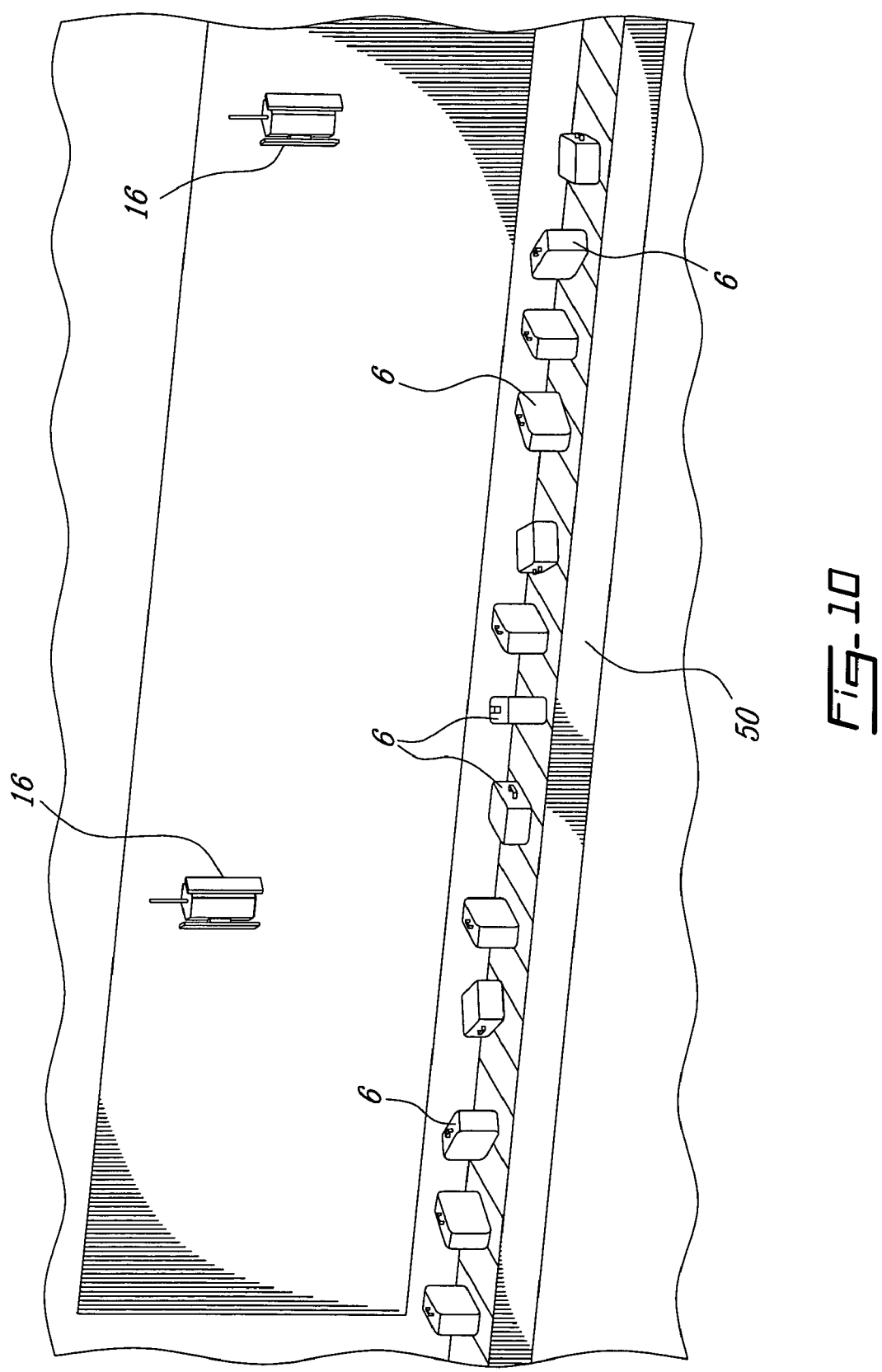
FIG. 10 is a perspective view illustrating the tracking of baggages on a conveyor using the system from FIG. 1.

As can be seen from FIG. 10, the tag 8 corresponding to each baggage 6 is tracked along its path by PBS 16 and SBS 18 (not shown). Moreover, each tag 8 verify the conformity of its itinerary by comparing the sequence of PBS 16 met along its path to the checkpoints stored in its memory during its activation. It is to be noted that the system 10 allows to reprogrammed a tag 8 with new checkpoints while it travels from the baggage registering desk 40 to the loading dock. Of course, all wireless communications of the system 10 are secured so as to prevent malicious attempts to tamper with the system 10.

The frequency of tag queries is adjusted in accordance with many factors, such as: the configuration of the baggage sorting system, the conveyors' speed, the number of activated tags, the wireless communication frequency band, the nature of the object or person to which the tags are tied, etc. Indeed, the system can be used to track baggage, bags, employees, trolleys, travellers, etc. For example, in some instances, a need could arise for tracking a specific baggage or person between shorter time intervals so as to know more precisely its path.

The baggage 6 continue their itinerary towards a baggage loading dock (see FIG. 6) where their presence is verified and acknowledged by the PCU 20 as explained hereinabove.

The PCU 20 allows detecting the vicinity of every tag 8 within its range. The range can be adjusted by calibration of the PCU 20.

Whenever the system 10 looses track of a tag 8 between checkpoints N and N+1, a two-level security system is activated.

The first level of security involves the tags 8. A tag 8 that does not detect the checkpoint N+1 following the checkpoint N sends a distress signal to be detected by the system 10. The distress signal is then registered by the system 10. The system 10 responds by activating a request task to an expert agent 76 configured to take in charge the tag 8 that sends distress messages. The expert agent 76 automatically updates information about the tag 8 such as its position, the power level of the transmitted signal, the power level of the battery. While the expert agent 76 is managing the tag 8, the system 10 informs the operator about the problem and then another operator equipped with a PCU 20 is sent to find the tag 8.

The second security level involves an expert agent 76 (see FIG. 12) implemented in the central server 14. The functions of the expert agent 76 include:

1. receiving from an operator parameters allowing the creation of tags dynamic nodes;
2. transmitting to primary and secondary base stations 16-18 commands allowing to assemble and manage tags 8 by dynamic node bundles;
3. receiving tracking parameters, such as identification code of tags 8, its position, the corresponding flight number, the tag's destination, etc., allowing real-time formation of dynamic nodes and tracking of tags 8 in the airports;
4. modifying the tag 8 communication parameters;
5. interacting with other expert agents to exchange tag-related information;
6. via a user-interface of the central server 14, allowing an operator to regulate tag operating parameters and observe tag movement in the airport;
7. managing entries and exits of tags 8 in the system 10;
8. communicating with tag recovery apparatus 24 to determine the tag flow in the airport;
9. receiving alarm signals from tags 8 and primary base stations 16 and managing lost tag searching procedures; and
10. performing system 10 diagnostic.

Returning to the second security level, the disappearance of a tag 8 between two checkpoints unbalances the node that includes the tag. The expert agent 76 then initiates a search. The search includes:

1. the primary and secondary stations 16-18 requesting an emergency identification of the tag 8 and listening to the corresponding communication channel;
2. once the tag 8 and the corresponding baggage 6 have been retraced and their position determined, sending an operator with a PCU 20 to intercept the baggage 6 (see FIG. 3), the coordinates of the baggage 6 being sent to the PCU 20 and displayed on its screen 4; and
3. if no acknowledgement signal is received from the missing tag 8, the system 10 determining the last known position thereof, which is between the N and N+1 checkpoints, and prompting an operator with a PCU 20 to go searching for the missing baggage 6 between the two checkpoints.

Returning briefly to FIG. 8, the information pertaining to the tags 8 and their respective control code are transferred from the boarding airports to the transit airport and then to the destination airport via the TIMS 26.

At the destination airport, an operator having a PCU 20 broadcast a signal to reactivate all incoming tags 8, then in a sleep mode, and compare the list of detected tags 8 to the list transmitted by central server 14 of the destination airport, as received by the TIMS 26. The system 14 from the destination airport then starts tracking and managing the incoming tag 8 as discussed hereinabove.

Alternatively, the signal to reactivate all incoming tags 8 can be broadcast by a PBS 16 nearby the tag arrival area.

Arrived at their destination, the tags 8 receive a signal from the last PBS 16, referred herein as the discharge PBS 16' (see FIG. 7). The cell 42 defined by the discharge PBS 16' include the baggage recovery carousel (not shown). The LEDs 32 from each tag 8 in this cell then flash, or display another visual signal, inviting the owner of the baggage 6 to introduce the unlocking code into the TRA 24.

An object tracking system according to the present invention allows implementing simple solutions to three (3) types of system's fault.

A hardware's fault is dealt with by rapidly replacing the faulty piece of hardware.

Figure 11:
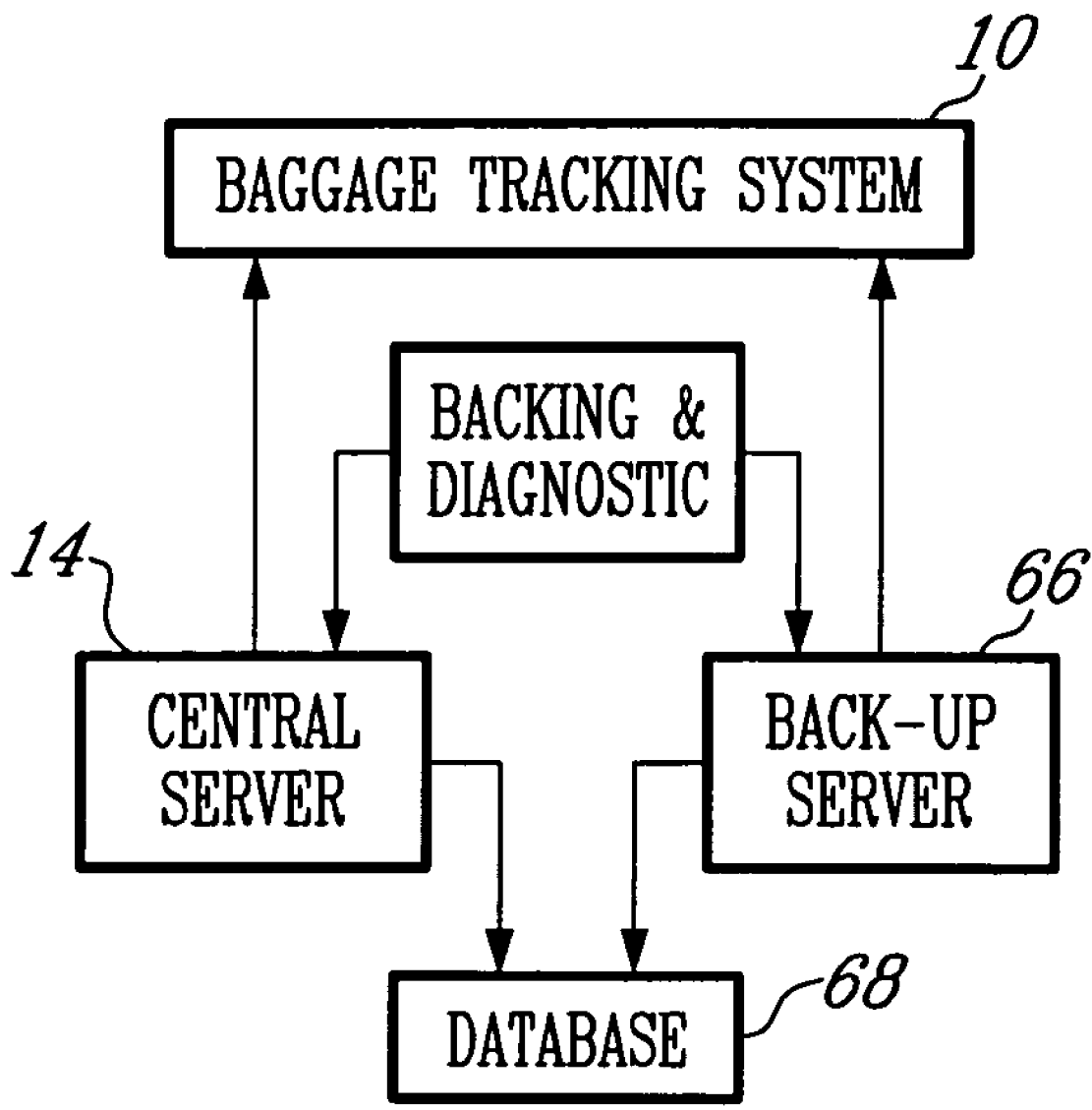
FIG. 11 is a bloc diagram of the system from FIG. 1, incorporating a back-up server.

A illustrated in FIG. 11, a system software's fault is minimized by storing dynamically all recorded data on a database 68 stored on an independent memory device or server coupled to the central server 14. A back-up server 66, which is also coupled to the database 68, is coupled to the central server 14 and is configured to monitor the central server 14 and to mirror all the configuration of the central server 14. Any hardware's or software's fault is detected by the backup server 66 which then continue the operation of the system 10, having access to the database 68.

The use of encoding and decoding for all communications and the use of a firewall allows minimizing hacking of the system 10 and malicious attempts to tamper with the system 10.

The use of wireless communication provides for an easy implementation of the system 10. More specifically, the central server 14, PBS 16, SBS 18 communicates using the IEEE 802.11 (WLAN) protocol via the Industrial Scientific and Medical (ISM) channel at 2.45 GHz. The tags 8 communicate wirelessly at 2.45 GHz.

Figure 12:
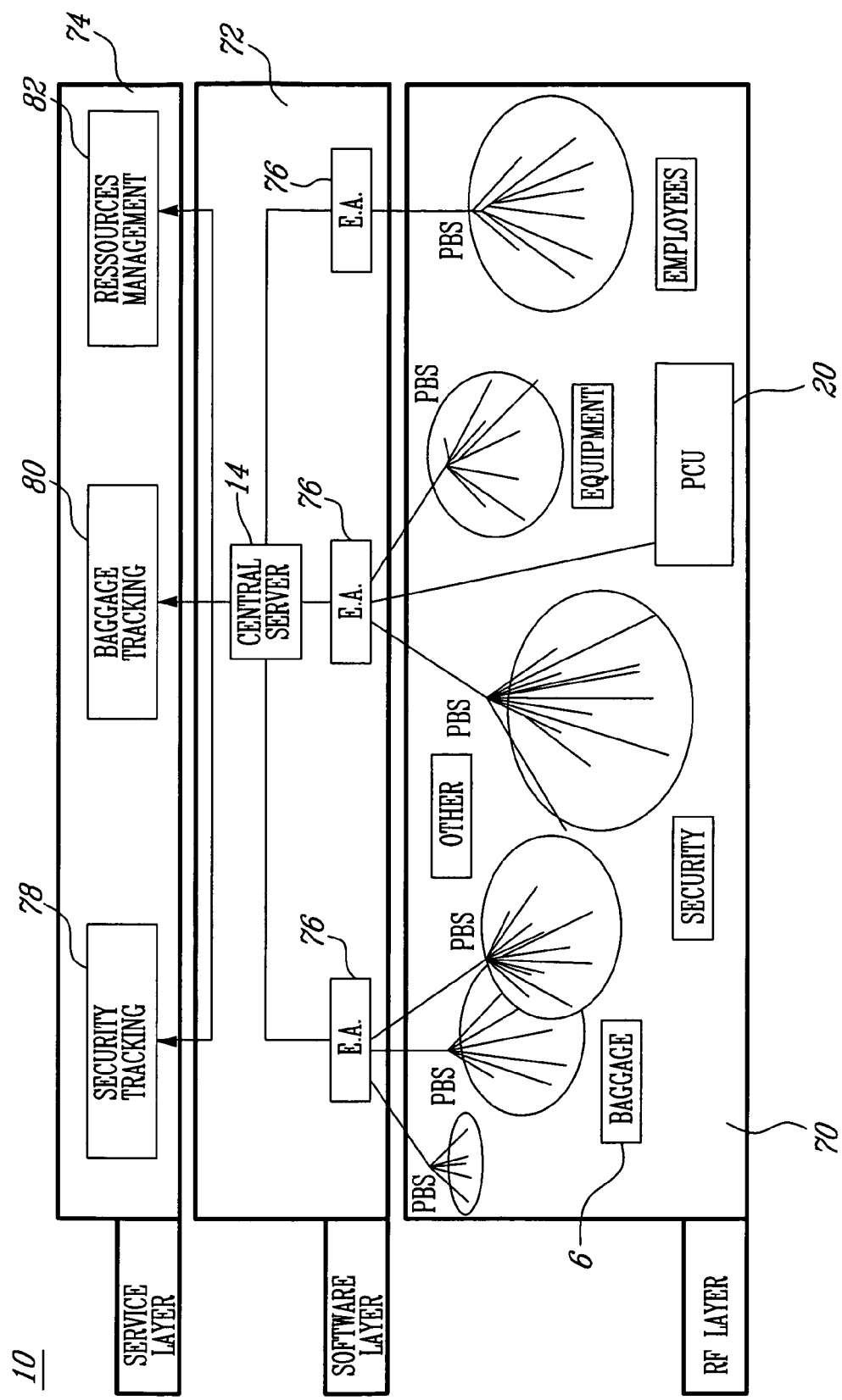
FIG. 12 is a schematic view of the system from FIG. 1, illustrating the multi-layer architecture of the system.

As illustrated in FIG. 12, the system 10 is implemented in three layers: a radio-frequency (RF) layer 70, a software layer 72 and a service layer 74.

The RF layer 70 comprises the wireless components of the system 10 forming a wireless local area network (WLAN). The system 10 allows primary base station 16 that are out of range of the central server 14 to communicate with the central server 14 via other PBS 16.

The software layer 72 is implemented in the central server 14 and includes the expert agents (EA) 76 and allows creating and managing dynamic nodes. The tags 8 are regrouped in the system 10 by the EA 76 according to their positions, the characteristics of their environment (surrounding interference, level of noise, etc.), the sequence of validation, the distance between baggage 6, their corresponding flight number and airline, their destination and transit, the intensity of their signal as received by the system 10, etc. This grouping virtually links the baggage 6 in the system 10, allowing their tracking and management. The grouping is said to be dynamic since a specific link can be modified at any given time. Depending on the nature of the object associated to a tag 8, the central server 14 processes the data information related to each tag 8 using a specific service module 78-82.

As illustrated in FIG. 12, the service layer 74 includes different service modules that can be used such as the security tracking module 78, baggage tracking module 80 and resources management module 82. It is to be noted that the expression "module" should be construed in a broad sense, included, but not limited to, a series a logic instruction programmed in the central server 14 allowing to process data information to achieve an expected result.

The security tracking module 78 allows to manage security aspect related to circulation of objects, goods, and people within predetermined areas. The resources management module 82 allows managing inventory and circulation of equipment and employees for example.

The number and location of the PBS 16 depend on the configuration and dimension of the baggage handling system, including the conveyors configuration and location 50. The number of PBS 16 is related to the additional services desired: baggage tracking, security tracking or resources management. The wireless protocol used to implement the system 10 gives the maximum electric field that can be used for indoor and outdoor environment. The system is configured so as to respect widely adopted protocol, national or international rules and regulations on radio signal used to avoid generating interferences on others appliances and protect human body. The protocol used affects the size of cells 42 in the system 10.

For example, for an average size airport such as the Dorval airport in Montreal and the JFK airport in New York, in the international flight hub, the dimension of the luggage handling area is about 1000 m by 650 m (650 000 m$^2$). About 50 000 baggages per day travel on this area. Considering the maximum amplitude of the electromagnetic field allowed by the IEEE 802.11 standard, ones can find that maximum size radius of cells should be around 100 meter for and indoor environment and depending of the configuration for free space signal propagation, the thickness and the type of material the walls are made of. In this configuration, different types of protocols can be used to allow tracking and communication to more than 100 000 baggage within some seconds (less than 3 seconds for some protocols) without any conflict between tags.

The system 10 can be deployed on different sections in an airport such as two hubs (not shown). Those two hubs are then linked together via the central server 14 by providing PBS 16 between the hubs.

When the PBS 16 and SBS 18 in a given cell 42 (FIG. 5) send query signals to tags 8 in the cell 42, each tag 8 responds sequentially. The central server 14 controls the exact time when each tag 8 has to respond to the system 10. The size of the communication code between a base station 16 or 18 and a tag 8, the frequency of the carrier wave, and the communication protocol determine the maximum capacity in terms of tag number that can be manage by the system 10 so as to prevent communication crashes.

Even though the illustrative embodiment of a system 10 according to the present invention includes a central server 14, the functionality thereof can be implemented on one or some of the primary and/or secondary base stations 16-18.

Also, the tag recording unit 12 is optional since the system 10 can be used with tag having a memory pre-programmed with information related to the object to which it will be attached.

Of course, the tags 8 can take many forms allowing to store information and transmit signal pertaining to such information. Tags 8 can also be permanently attached to the object.

The wireless communication signal can also take many forms, and so is the communication protocol used.

An object tracking system according to the present invention can be used to track many kinds of objects and life forms, including people. It can be used, for example, as an inventory managing system. Also, the tracking system may be used to track objects in a single premises.

Although the present invention has been described hereinabove by way of preferred embodiments thereof, it can be modified without departing from the spirit and nature of the subject invention, as defined in the appended claims.

What is claimed is:

1. A wide area object tracking system comprising:
   at least one primary base station and a pair of secondary base stations; each of said pair of secondary base stations being so coupled to said primary base station as to define a tag detecting cell; each of said primary and two secondary base stations being configured to receive a tag signal broadcast from a tag attached to an object to be tracked, yielding three received signals indicative of the location of said tag within said cell; whereby a plurality of overlapping said tag detecting cells in a given space would allow tracking objects at any place within said given space;
   a central server coupled to said at least one primary base station; and
   a tag recovery apparatus coupled to said central server
   wherein said tag recovery apparatus includes a device to input a tag unlocking code, a tag depository compartment for receiving tags, and a guarantee ticket distributor to provide a guarantee ticket in exchange for a tag provided in said tag depository compartment.

2. A system as recited in claim 1, wherein said tag recovery apparatus is wirelessly coupled to said central server.

3. A system as recited in claim 1, wherein said tag including a rechargeable power source; said tag recovery apparatus being configured to recharge the power source.

4. A system as recited in claim 1, wherein said tag recovery apparatus being configured to forward information to said central server about tags received in said tag depository compartment.

5. A system as recited in claim 1, wherein said guarantee ticket being selected from the group consisting of cash and discount coupon.

6. A system as recited in claim 5, wherein said tag is rented and said guarantee ticket is issued in exchange for said rented tag.

7. A system as recited in claim 1, further comprising at least one tag to be attached to an object to be tracked; said at least one tag including a casing and attaching means releasably secured to said casing; said attaching means including a loop having two ends and being secured to said casing at one end and releasably mounted in said casing at its other end; said other end being releasably mounted in said casing via a releasable locking mechanism; said tag recovery apparatus being configured to receive a list of central server tag unlocking codes from said central server for comparison with inputted tag unlocking code both to be used in assessing if said releasable locking mechanism should be unlocked.

8. A system as recited in claim 1, wherein said tag recovery apparatus includes a display screen and a controller configured so as to display on said display screen a menu offering different form of retribution in exchange for tags.

\* \* \* \* \*